United States Patent Office 3,709,835
Patented Jan. 9, 1973

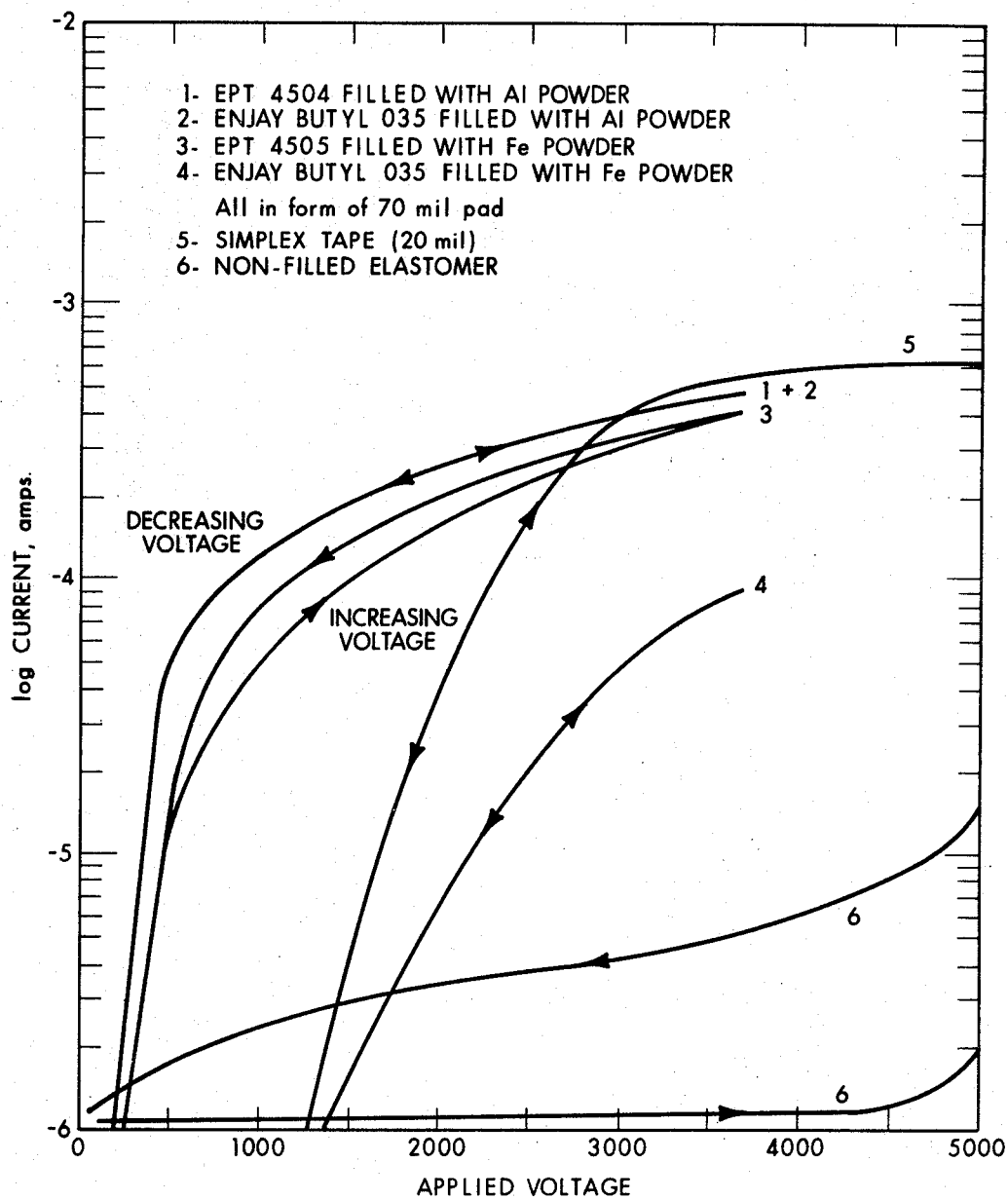

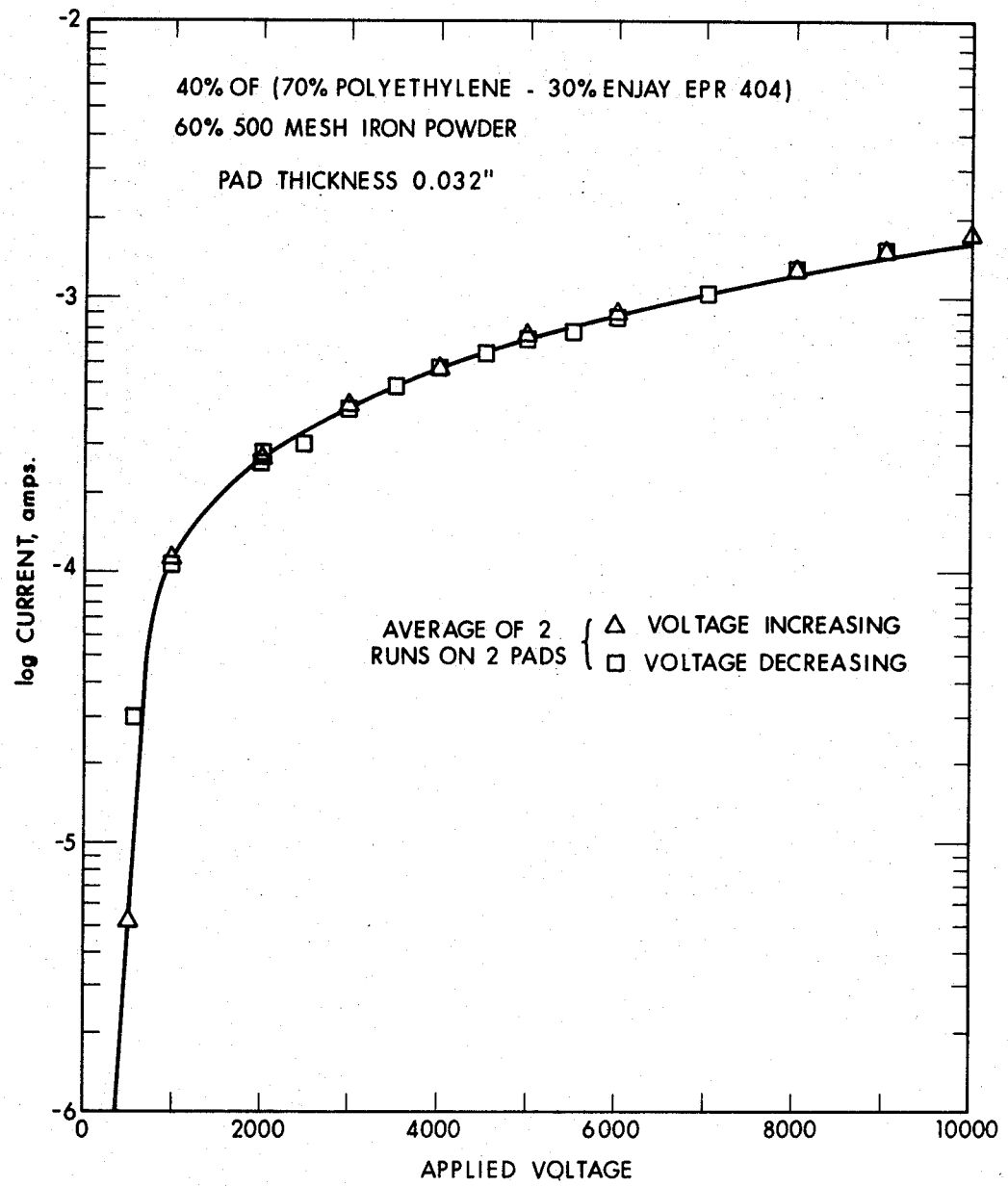

---

3,709,835
NOVEL COMPOSITIONS WITH CONTROLLED ELECTRICAL PROPERTIES
Eric O. Forster, Scotch Plains, N.J., assignor to Esso Research and Engineering Company
Continuation of application Ser. No. 678,655, Oct. 27, 1967. This application Sept. 29, 1970, Ser. No. 76,648
Int. Cl. H01b 1/02, 7/00
U.S. Cl. 252—513
6 Claims

ABSTRACT OF THE DISCLOSURE

Semi-conductive materials suitable for use as high voltage insulators comprising a polymer having a dielectric constant of at least 2.0 and a filler selected from the group consisting of electrically conductive metals and their alloys, said filler having a particle size range of about 0.05 to about 50 microns, said particles having a linear distribution of particle size with an average particle size of about 1 to about 20 microns.

---

Figure 3A:
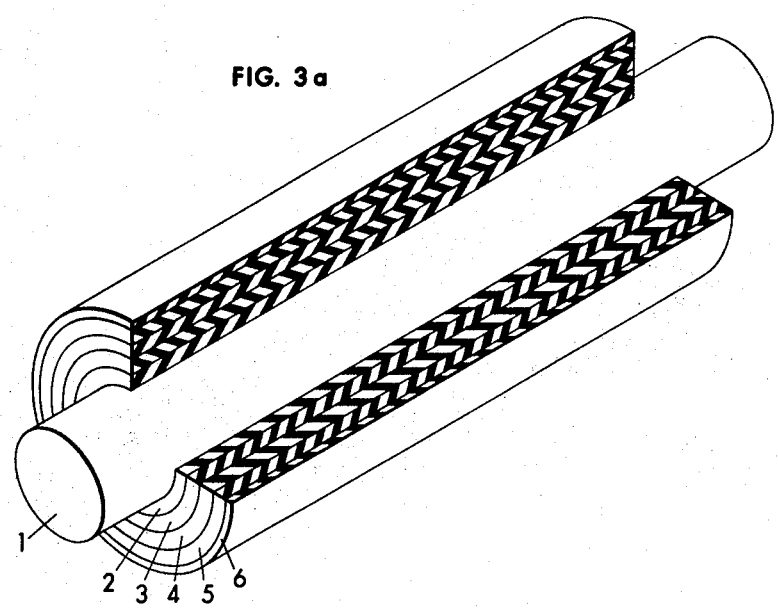

This application is a continuation application of Ser. No. 678,655 filed Oct. 27, 1967.

BACKGROUND OF INVENTION

Elastomers such as butyl rubber, ethylene propylene copolymers, ethylene propylene terpolymers (EPDM) and SBR have been used for wire insulation and generally as electrical insulators because of their inability to conduct electrical currents. In many applications involving high electrical stress of 10 kv or greater, it becomes difficult if not impossible to join cables without enhancing electrical breakdown at the splice.

When high voltage electric current flows through a conductor, a field is set up in the insulation surrounding the conductor. In order to splice a second conductor onto the first conductor, it is necessary to remove a portion of the insulation. Reinsulating the stripped wire with the same type of insulation is unsatisfactory since the discontinuity between the insulations results in field breakdown and arcing across the insulated splice. Similarly, at terminal points where the insulation of the cable has been removed for contact purposes, it is necessary to protect the terminal and base wire from corona discharges to ground. Most insulating materials are inadequate, at conventionally used thicknesses, in preventing such discharge and breakdown. Theory predicts that one could avoid these difficulties if one could produce a material, the electrical conductivity of which is a function of applied stress provided that such dependency would be reversible.

High voltage conductors are commonly insulated with crosslinked polyethylene. This material, however, has the disadvantage that it is prone to bubble formation during curing and hence breakdown at high voltages. Further heat generation within the polymer as a result of the high voltage field surrounding the conductor causes thermal degradation. If the acceleration potential, i.e. voltage drop, across the insulator could be reduced, arcing and breakdown could substantially be eliminated.

Semi-conductive tapes have been formed by incorporating silicon carbide into PVC polymers. These tapes have been useful in avoiding field breakdown splices in high voltage lines.

SUMMARY OF INVENTION

It has surprisingly been found that semi-conductors suitable for use as insulating materials for high voltage line splices may be prepared by dispersing particles of metal and magnetic or non-magnetic alloys, into a polymer, the polymer preferably having a dielectric constant of at least 2.0. Additionally, by controlling the concentration of the particles as a function of thickness of the insulator, an insulation material may be prepared having controlled electrical properties that are not subject to breakdown at high voltages.

In the practice of this invention metal or alloy particles are dispersed in a polymer, preferably an elastomer, and compounded with various curing agents and bonding agents. The compounded material is then extruded onto an electrical conductor and cured in place.

The compositions of this invention may be formed into tapes for wrapping splices. Similarly, heat shrinkable tubes may be formed to be placed over splices and shrunk into place.

DETAILED DESCRIPTION

Throughout the specification and claims, the term "electrically conductive metals" means those materials which have a resistivity of between about $10^{-6}$ and about $10^{-1}$ ohm-centimeters. Typical of such electrically conductive metals are magnesium, the metals of Group VIII of the Periodic Table of the Elements (E. H. Sargent & Co., 1966) such as iron, cobalt, nickel and platinum, the metals of Group I–B of the Periodic Table such as silver, gold and copper or the metals of Group II–B of the Periodic Table of the Elements such as zinc and aluminum. Illustrative of the magnetic materials suitable for use in the practice of this invention are alloys such as Fe-Ni, Co-Ni, $Cu_2MnAl$, and $Cu_2MnSn$. Illustrative of suitable non-magnetic materials are alloys such as Cu-Sn, Cu-Zn, and Al-Mg.

The term "semi-conductor" as used in the specification and claims means a material whose conductivity is a non-linear function of the applied stress, i.e. voltage potential, and which has a resistivity of between $10^1$ to $10^{10}$ ohm centimeters. While metals tend to have increasing resistivity with increasing temperature, the semi-conductors show a decrease in resistivity with increase in temperature.

Under low voltage stresses, the semi-conductors act as insulators and conduct no electricity. As the voltage increases to the order of 1.0–100 kilovolts, the semi-conductors begin to conduct electricity, the conductance being a function of the stress applied and increasing as the applied stress increases.

Any polymer which may be readily extruded or coated onto an electrical conductor is suitable for use in the practice of this invention. Preferably, the polymer has a dielectric constant greater than 2.0. Illustrative of such polymers are polyethylene, butyl rubber, ethylene-propylene copolymers, ethylene-propylene terpolymers (EPDM), styrene butadiene rubber, polyvinyl chloride and mixtures thereof.

The expression "butyl rubber" as employed in the specification and claims is intended to include copolymers made from a polymerization reaction mixture having therein about 70 to about 99.5% by weight of an isoolefin which has about 4 to 7 carbon atoms and about 30 to 0.5% by weight of a conjugated multiolefin having about 4 to about 14 carbon atoms. The resulting copolymer contains 85 to 99.5% of combined isoolefin and 0.5 to 15% of combined multiolefin. The term "butyl rubber" is described in an article by R. M. Thomas et al. in Industrial Engineering and Chemistry, vol. 23, pages 1283 et seq., October 1940.

The butyl rubber generally has a Staudinger molecular weight between 20,000 to 500,000; preferably about 25,000 to about 200,000; especially 45,000 to 60,000; and a Wijs Iodine No. of about 0.5 to about 50; preferably 1 to 15. The preparation of butyl rubber is described in U.S. Pat. 2,356,128 which is incorporated herein by reference.

Typical of such butyl rubber is Enjay Butyl 035 (Enjay Chemical Co.) a polymer having a Mooney viscosity at 212° F. of about 38–47 and a mole percent unsaturation of about 0.6 to about 1.0.

The term "EPDM" is used in the sense of the definition as found in ASTM-D-1418-64 and is intended to mean a terpolymer containing ethylene and propylene in the backbone and a diene in the side chain. Illustrative methods for producing these terpolymers are found in U.S. Pat. 3,280,082 and British Pat. 1,030,989 which are incorporated herein by reference. Any EPDM may be used in the practice of this invention.

The diene monomer is preferably a nonconjugated diene. Illustrative of these nonconjugated diene monomers which may be used in the terpolymer (EPDM) are hexadiene, dicyclopentadiene, ethylidene norbornene, methylene norbornene, propylidene norbornene, and methyl tetrahydroindene. The particular diene used does not form a critical part of this invention and any EPDM fitting the above description may be used. A typical EPDM is Vistalon 4504 (Enjay Chemical Co.) a polymer having a Mooney viscosity at 212° F. of about 40 prepared from a monomer blend having an ethylene content of about 56 wt. percent and a nonconjugated diene content of about 3.3 wt. percent.

The electrically conductive metal particles and ferromagnetic particles used in this invention should have a particle size fine enough to pass through a 425 mesh screen, i.e. less than 50 microns, preferentially through a 500 mesh screen, i.e. less than 45 microns. The particle size may vary between about 0.05 to about 50 microns, more preferably about 0.05 to about 45 microns, most preferably about .05 to 30 microns. The average particle size is preferably 1 to about 30 microns; more preferably about 10 to about 20 microns. To produce satisfactory results, in terms of elongation, tensile strength and electrical properties, it is advisable to use a powder of broad but uniform particle size distribution. This can be achieved by intentionally mixing powders produced by grinding particles and sieving them through a 500 mesh screen, for example, and admixing to this material a fraction of colloidally produced powder (i.e., ca .05 micron) of the same material. The methods for producing colloidal particle size powdered metals is well known to the art.

By controlling the ratio of two fractions, one can maximize either electrical or mechanical properties or produce a compromise which satisfies the particular needs under consideration. The concentration of the electrically conductive metal powders in the polymer matrix may be from about 20 to about 90 wt. percent, preferably from about 40 to about 80 wt. percent, more preferably from 50 to 70 wt. percent.

The terms "filler" or "fillled" as used throughout the specification and claims refer to the electrically conductive particles of metal and magnetic or non-magnetic alloys of this invention.

In the practice of this invention, it has been found advantageous to use a coupling agent which serves to bring about a better bond between the metal particles and the polymer matrix. Preferably, the coupling agent is an unsaturated organosilane which is employed in amounts ranging from about 0.1 to about 5, preferably about 1 to about 4 parts per weight per hundred parts of polymer mix. Although the metal particles may be treated with the organosilane rather than adding the organosilane to the polymer mix, the later technique has been found to be more convenient.

The term "organosilane" as employed herein includes the silane, its silanols (the corresponding partially or completely hydrolyzed forms of the silane), its siloxanes (the corresponding condensation products of the silanols) and mixtures thereof. The organosilane may be represented by the formula:

wherein $R_1$ is a $C_2$–$C_{16}$ radical containing vinyl type unsaturation selected from the group consisting of alkenyl styryl, alkenyl alkyl, alkenoloxyalkyl; X is selected from the group consisting of hydroxyl, alkoxy acyloxy; $R_2$ and $R_3$ are independently selected from the group consisting of hydroxyl, methyl, alkoxy, acryloxy and $R_1$. Nonlimiting useful compounds which may be employed are the following: vinyl tri(beta-methoxyethoxy)-silane, vinyl triethoxy silane, divinyl diethoxy silane, allyl triacetoxy silane; in place of the vinyl and allyl groups of the above named compounds, the corresponding styryl, acryloalkyl, methacryloalkyl, acryloxy propyl and methacryloxy propyl compounds may be used. All of the silanes are convertible into the useful corresponding silanols by partial or complete hydrolysis with water. Preferred organosilanes are gamma-methacryloxypropyl trimethoxy silane and vinyl tri-beta-methoxyethoxy silane.

The following examples serve to further illustrate how the processes of this invention may be carried out as well as the benefits derived from its use.

EXAMPLE 1

A series of compounded mixes designated as samples A–F were prepared using Vistalon 4504 and Enjay Butyl 035 as the polymers. The metal or ferromagnetic powders used were iron powder, iron oxide powder and aluminum powder. The exact formulation of these blends is shown in Table I.

In the preparation of these blends, the polymer was milled on a cool (i.e. below 130° F.) mill and allowed to band. The metal powder or magnetic material was gradually added to the banded polymer at a rate sufficient to prevent destruction of the polymer band. After the filler material was added, the other compounds were then added starting with the silane. The vulcanizing agents were added last and the mixture was allowed to blend for about 20 to about 30 minutes. The samples were then press cured at 320° F. for 20 minutes to form 70 mil pads, the physical properties of which are shown in Table I. The electrical properties of these filled metal elastomers are shown in Table II.

It will be noted that as the applied voltage is increased from 100 volts to 3500 volts, the current increases. It is noted further that there is no hysteresis effect, that is in going from the lower voltage to the higher voltage and back to the lower voltage, there is essentially no change in electrical properties.

TABLE I.—POWDERED METAL FILLED ELASTOMERS

|  | A | B | C | D | E | F |
|---|---|---|---|---|---|---|
| Enjay vistalon 4504 | 100 | 100 | 100 |  |  |  |
| Enjay butyl 035 |  |  |  | 100 | 100 | 100 |
| Zinc oxide | 5 | 5 | 7.5 | 5 | 5 | 5 |
| Iron powder 500 mesh | 200 |  |  | 200 |  |  |
| 0.5 fired iron oxide powder |  | 200 |  |  | 200 |  |
| Aluminum powder |  |  | 200 |  |  | 200 |
| A-172 silane [1] | 2 | 2 | 2 | 2 | 2 | 2 |
| AgeRite resin D [2] | 1.5 | 1.5 | 1.5 |  |  |  |
| ERD 90 ($Pb_3O_4$ dispersed) | 5.6 | 5.6 | 5.6 | 5.6 | 5.6 | 5.6 |
| Drimix TAC [3] | 2 | 2 | 2 |  |  |  |
| Di-Cup 40 HAF [4] | 7 | 7 | 7 |  |  |  |
| Stearic acid |  |  |  | 0.5 | 0.5 | 0.5 |
| Wax [5] |  |  |  | 5 | 5 | 5 |
| Altax [6] |  |  |  | 4 | 4 | 4 |
| EGD 70 [7] |  |  |  | 2.85 | 2.85 | 2.85 |
| Press cures 20'/320° F.: |  |  |  |  |  |  |
| Hardness, Shore A | 64 | 71 | 80 | 48 | 45 | 63 |
| 100% modulus, p.s.i. | 220 | 220 |  | 130 | 80 | 160 |
| Tensile strength, p.s.i. | 380 | 260 | 370 | 780 | 140 | 320 |
| Percent elongation | 280 | 210 | 80 | 790 | 600 | 710 |

[1] Vinyl tris (methoxy ethoxy) silane.
[2] Polymerized trimethyl dihydroquinoline.
[3] 25% dispersion of triallyl cyanurate on microcel.
[4] Dicumyl peroxide 40% on carbon black.
[5] Paraffin wax having a melting point of 133° F.
[6] Benzothiazyl disulfide (R.T. Vanderbilt Co.).
[7] P-quinone dioxime.

TABLE II.—ELECTRIC PROPERTIES OF METAL FILLED ELASTOMERS

| | A | B | C | D | E | F |
|---|---|---|---|---|---|---|
| Rubber | EPT | EPT | EPT | (¹) | (¹) | (¹) |
| Filler | Fe | Al | $Fe_2O_3$ | Fe | Al | $Fe_2O_3$ |
| Dielectric constant | 4.6 | 9.83 | 5.2 | 4.8 | 10.65 | |
| Loss tangent | 2 | 0.61 | | 1.8 | 0.98 | |
| Current² at 100 volts, amp | $1.9 \times 10^{-10}$ | $1.2 \times 10^{-10}$ | $10^{-10}$ | $10^{-10}$ | $1.1 \times 10^{-10}$ | $10^{-10}$ |
| Current² at 500 volts, amp | $4 \times 10^{-5}$ | $5.8 \times 10^{-8}$ | | | $7 \times 10^{-5}$ | |
| Current² at 3,500 volts, amp | $3.8 \times 10^{-4}$ | $4 \times 10^{-4}$ | $10^{-5}$ | $6 \times 10^{-5}$ | $4.6 \times 10^{-4}$ | $10^{-5}$ |
| Current² at 500 volts, amp | $3 \times 10^{-5}$ | $6 \times 10^{-5}$ | | | $6.2 \times 10^{-5}$ | |
| Current² at 100 volts, amp | $2 \times 10^{-10}$ | $1.2 \times 10^{-10}$ | $10^{-10}$ | $10^{-10}$ | $1.1 \times 10^{-10}$ | $10^{-10}$ |

¹ Butyl.
² Measured with a Keithley 610B electrometer using a N.J.E. regulated power supply with continuously variable voltage output from 0 to 30,000 v. DC, shielded connectors and a 2″ diameter measuring electrode. Samples were measured at 100, 200, 500, 1,000, 1,500, 2,000, 2,500, 3,000 and 3,500 volts, keeping the voltage at these values for at least five minutes. The voltage was reduced in the same manner. Each sample was subjected to at least 3 such cycles.

These data are shown graphically in FIG. 1. Curve 5 is a typical curve for a Simplex tape (a silicon carbide containing PVC) of 20 mil thickness, whereas curve 6 is a typical curve for an elastomer having no filler. It will be noted that the non-filled material and those filled with nonconductive $Fe_2O_3$ show only the current gain as a function of applied voltage predictable from Ohm's law. Hence, the electrical stress or voltage drop across any insulating material made of any such materials will be very large, whereas in contrast, the electrical stress is decreased in the semi-conductors of this invention due to the increased current flow.

Example 2

A heat shrinkable composition was prepared in the following manner:

A blend of polyethylene and ethylene-propylene copolymer were mixed for 1 to 2 minutes in a Banbury mill. Fifty parts of copolymer were used to 50 parts of ethylene and 1 part of AgeRite D stabilizer were mixed to 260° F. for 3 minutes. The temperature was then raised to 300° F. while mixing was continued. At this temperature the blend was discharged. An aliquot of this master batch was used in producing a final formulation which comprised:

Formulation: Parts
Master batch _____ 60
Polyethylene _____ 40
AgeRite D _____ 0.4
Zinc oxide _____ 5.0
ERD 90 ($Pb_3O_4$, 90%) _____ 5–6
Drimix TAC (25% dispersion of triallyl cyanurate on microcel) _____ 2
500 mesh iron powder _____ 150
A–172 silane (vinyl tris(methoxyethoxy)silane) _____ 1
Di-Cup R (dicumyl peroxide) _____ 2.8

Mixing was accomplished in a Banbury blender according to the time/temperature schedule shown below. The final composition of the polymer blend contained 70 parts polyethylene, 30 parts ethylene-propylene rubber. The ingredients listed above were added to the Banbury mixer according to the following time schedule:

Start:
0 minutes—Master batch AgeRite resin D charged;
1 minute—Add polyethylene, raise temperature to 220° F. and flux for 3 minutes;
4 minutes—Add all other ingredients in sequence shown except the Di-Cup R;
8 minutes—Dump and allow to cool; add Di-Cup R using a cool mill.

The finished blend was vulcanized at 500 p.s.i. and 320° F. for 20 minutes. The resulting 0.032 inch pad was tested electrically, the results of which test are shown in FIG. 2. It will be noted that the product had excellent reversible response to electrical stresses. The material had a breakdown voltage of about 120 kilovolts per centmeter, whereas the unfilled material is known to fail at stresses below 100 kilovolts per centimeter.

It is often desirable to shield current carrying conductors such as television antennas and auto electrical coil wiring and plug wirings to prevent disruptive effects from stray currents. Such shielded conductors generally have a central conductor covered with an insulator and an outer conductive shield which is connected to ground. A similar shielded material having equivalent shielding protection properties may be prepared as shown in FIG. 3a. The central conductor, 1, is coated with an insulating composition, 2, which comprises the semi-conducting material of this invention containing about 25% of the filler particles. The succeeding layers, 3, 4 and 5, are composed of the semi-conducting material of this invention, each succeeding layer having a higher percentage of filler. For example, layer 3 may have from about 30 to 40 wt. percent filler, layer 4 may have 50 to 60 wt. percent filler and layer 5 may have 70 to 80 wt. percent filler. The outer layer, 6, contains about 990 wt. percent filler and in this case the filler material may consist of particles larger than those specified for the semi-conducting material of this invention and may be as large as 200 microns in order to insure that the outer coating is conductive. The term "conductive coating" as used in the specification and claims is one which has a resistivity less than about $10^1$ ohm-centimeters. The particle size range in the conductive coating may vary from about 0.05 to about 200 microns. Where the larger particles are used, the filler may be present at about 80 to 90 wt. percent. This outer coating acts as a shielding and is connected to ground just as the prior art shielded terminals the outer sheath is connected to ground.

Figure 3B:
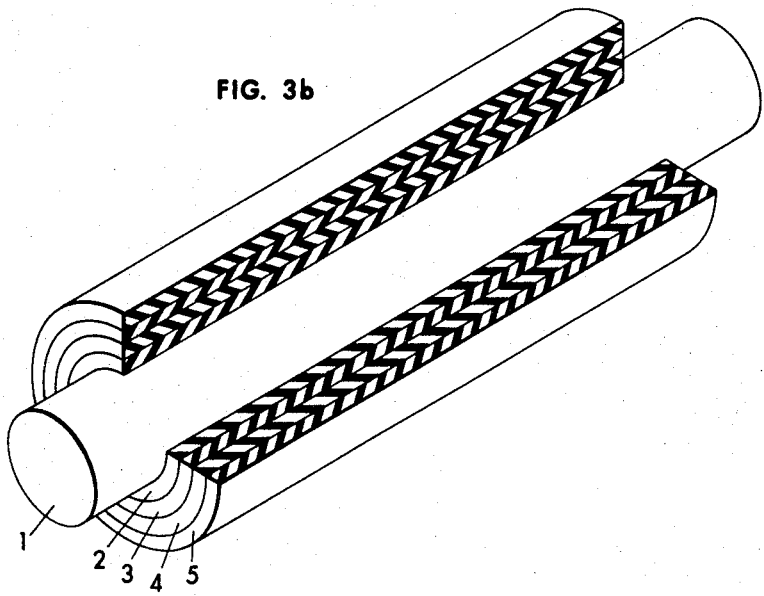

Using the semi-conductive compositions of this invention it is possible to prepare an insulated electrical conductor which has an unusually high breakdown voltage and the surprising characteristic that current leakage may occur without actual damage to the insulating material. Referring now to FIG. 3b, a center electrical conductor, 1, is coated with a layer of the semi-conducting material, 2, of this invention having about 80–90 wt. percent filler particles. The succeeding layers, 3, 4 and 5, each have a lesser amount of filler, for example, layer 3 has from about 70 to 80% filler, layer 4 has from about 50 to 60% filler and layer 5 has about 25 to 50% filler.

The semi-conductive characteristics of the coating permit a limited current flow within the insulator at high voltage stresses and therefore reduces the acceleration potential across the insulator, thereby giving the material an unusually high breakdown voltage. In the event of overvoltage loads, a sufficient current flow may occur to prevent actual rupture of the insulator as would normally be the case in conventional insulation materials.

Since many different embodiments of this invention may be made without departing from the spirit and scope thereof, it is to be understood that the present invention is not limited to the embodiments specifically disclosed in the specification thereof.

What is claimed is:
1. An insulated electrical conductor wherein said electrical conductor is coated with a semiconductive composition comprising:

(a) a polymer having a dielectric constant of at least 2.0;
(b) about 20 to about 90 wt. percent, based on the total composition, of a filler selected from the group consisting of electrically conductive metals and their alloys, said filler having a particle size range of about 0.05 to about 50 microns, said particles having a linear distribution of particle size with an average particle size of about 1 to about 30 microns; and
(c) an organosilane included in the composition at about 0.5 to about 5 parts per 100 based on the total composition wherein said organosilane is an unsaturated silane, its silanol, its siloxane or mixtures thereof.

2. The composition of claim 1 wherein the silane is first coated onto the metal particles.

3. The composition of claim 1 wherein the silane is blended into the polymer.

4. The insulated conductor of claim 1 wherein the filler is selected from the group consisting of iron, nickel, cobalt, aluminum, zinc, manganese and mixtures thereof, said filler having a particle size range of about 0.05 to about 30 microns and an average particle size of about 10 to about 20 microns.

5. The composition of claim 1 wherein the organosilane is vinyl tris(methoxyethoxy) silane.

6. The insulated conductor of claim 1 wherein the polymer is selected from the group consisting of butyl rubber, EPDM, ethylene propylene copolymers, polyethylene, styrenebutadiene rubber, polyvinyl chloride and mixtures thereof.

References Cited

UNITED STATES PATENTS

| | | | |
|---|---|---|---|
| 3,259,688 | 7/1966 | Towne et al. | 252—511 |
| 3,491,056 | 1/1970 | Saunders et al. | 252—512 |
| 3,507,773 | 4/1970 | Grangaard | 252—511 |
| 3,444,183 | 5/1969 | Hubbuch | 252—511 |

DOUGLAS J. DRUMMOND, Primary Examiner

U.S. Cl. X.R.

174—110 S, 110 SR; 252—512